United States Patent [19]

Brüstle et al.

[11] Patent Number: 5,611,637
[45] Date of Patent: Mar. 18, 1997

[54] FURNITURE FITTING

[75] Inventors: Klaus Brüstle; Emanuel Netzer, both of Höchst; Edgar Huber, Hard, all of Austria

[73] Assignee: Julius Blum Gesellschaft m.b.H., Höchst, Austria

[21] Appl. No.: 518,604

[22] Filed: Aug. 21, 1995

[30] Foreign Application Priority Data

Aug. 26, 1994 [AT] Austria .................... 1644/94

[51] Int. Cl.⁶ .................................... F16B 2/04
[52] U.S. Cl. ............... 402/297; 403/230; 403/409.1; 312/348.4; 312/111; 312/140
[58] Field of Search .................. 403/230, 231, 403/405.1, 407.1, 409.1, 292, 297, 264, 300, 301, 314, 245, 119, 321, 323; 312/348.4, 348.1, 334.1, 111, 140; 411/44

[56] References Cited

U.S. PATENT DOCUMENTS

| | | | |
|---|---|---|---|
| 3,730,568 | 5/1973 | Giovannetti | 403/245 |
| 4,131,376 | 12/1978 | Busse | 403/231 X |
| 4,549,831 | 10/1985 | Lautenschlager, Jr. | 403/323 X |
| 4,846,538 | 7/1989 | Röck et al. | |
| 4,874,212 | 10/1989 | Röck et al. | |
| 4,902,080 | 2/1990 | Berger | 312/348.4 |
| 4,984,929 | 1/1991 | Röck et al. | |
| 5,002,346 | 3/1991 | Gasser | 312/348.4 |
| 5,364,181 | 11/1994 | Scheible | 312/348.4 |

FOREIGN PATENT DOCUMENTS

| | | | |
|---|---|---|---|
| 267477 | 5/1988 | European Pat. Off. | 312/348.4 |
| 289866 | 11/1988 | European Pat. Off. | 312/348.4 |
| 2445461 | 8/1980 | France | 403/231 |
| 2610200 | 9/1977 | Germany . | |
| 3643312 | 6/1988 | Germany | 312/348.4 |

Primary Examiner—Harry C. Kim
Attorney, Agent, or Firm—Wenderoth, Lind & Ponack

[57] ABSTRACT

A furniture fitting for connecting parts of an article of furniture includes a dowel to be inserted into a hole in one furniture part and an expansion member movable relative to the dowel between a relaxed position, enabling the dowel to be inserted into the hole, and an expanded position, enabling the dowel to be locked in the hole. A holding member is mounted with respect to the expansion member for rotatable movement relative to the dowel to actuate the expansion member to move to or from the expanded position thereof upon such rotatable movement relative to the dowel. The holding member is to be connected to another furniture part.

10 Claims, 7 Drawing Sheets

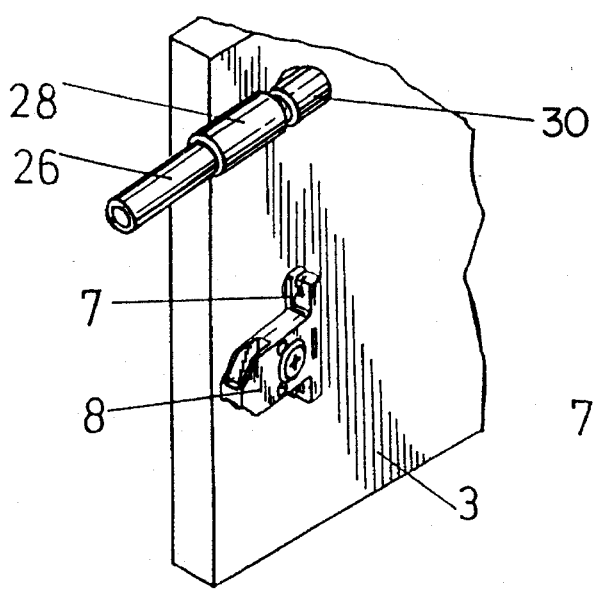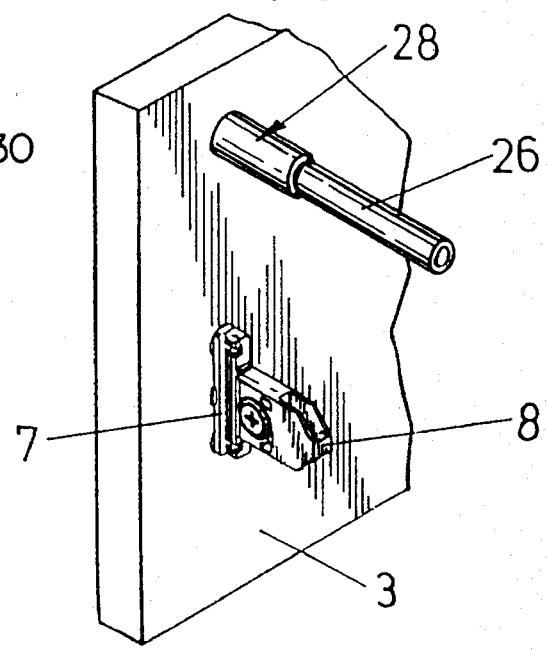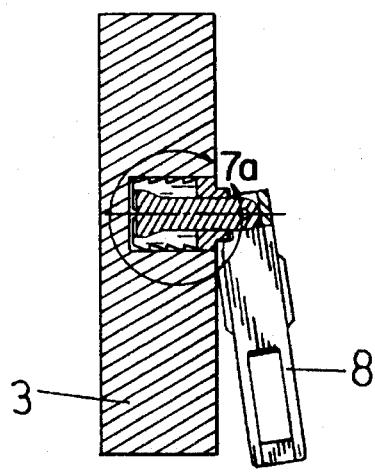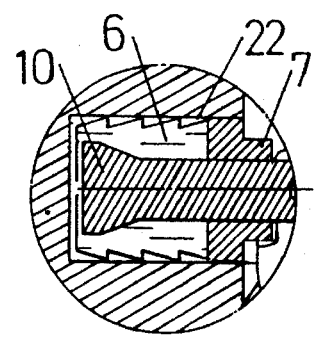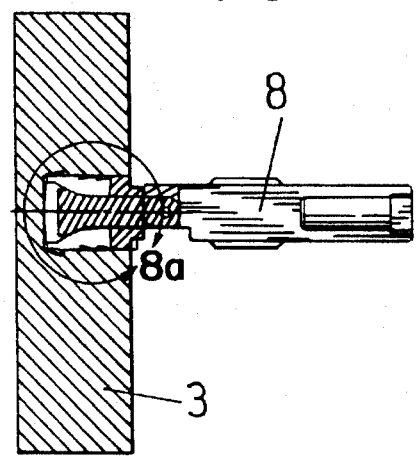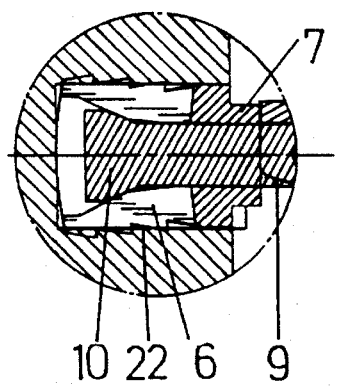

5,611,637

FURNITURE FITTING

SUMMARY OF THE INVENTION

The invention relates to a furniture fitting for connecting parts of an article of furniture. The fitting includes a dowel to be inserted into a hole in one furniture part, an expansion member movable relative to the dowel between a relaxed position, enabling the dowel to be inserted into the hole, and an expanded position, enabling the dowel to be locked in the hole, and a holding member to be connected to another furniture part.

AT-PS 391 409 and AT-PS 391 987 show furniture fittings for mounting a front plate of a drawer to drawer side walls. These fittings comprise a holding member mounted on the front plate and a holding member mounted on the drawer side wall, such holding members being connectable. AT-PS 391 063 shows a furniture fitting for fastening a rail of a drawer to the drawer front plate.

It is the object of the invention to provide a furniture fitting for connecting two furniture parts, e.g. the front plate of a drawer and a drawer side wall or the front plate of a drawer and a drawer rail, which fitting can be mounted in at least one of the furniture parts without the use of a tool. The furniture fitting is to be of simple construction.

According to the invention this is achieved in that a holding member is mounted with respect to an expansion member and for rotatable movement relative to a dowel to actuate the expansion member to move to or from an expanded position thereof upon the rotatable movement relative to the dowel.

BRIEF DESCRIPTION OF THE DRAWINGS

FIG. 1a is an enlarged perspective view of a detail of FIG. 1;

FIG. 5 is a perspective view of a part of a front plate of a drawer showing two embodiments of fittings according to the invention in positions in which the fitting are insertable into holes in the front plate;

FIG. 6 is a view similar to FIG. 5 but with the furniture fittings shown in locked positions;

FIG. 7 is a sectional view of a front plate and a dowel of a fitting according to the invention;

FIG. 7a is an enlarged section of a detail of FIG. 7;

FIG. 8 is a sectional view similar to FIG. 7, but with the fitting in a locked position;

FIG. 8a is an enlarged section of a detail of FIG. 8;

DESCRIPTION OF THE PREFERRED EMBODIMENTS

Figure 1:
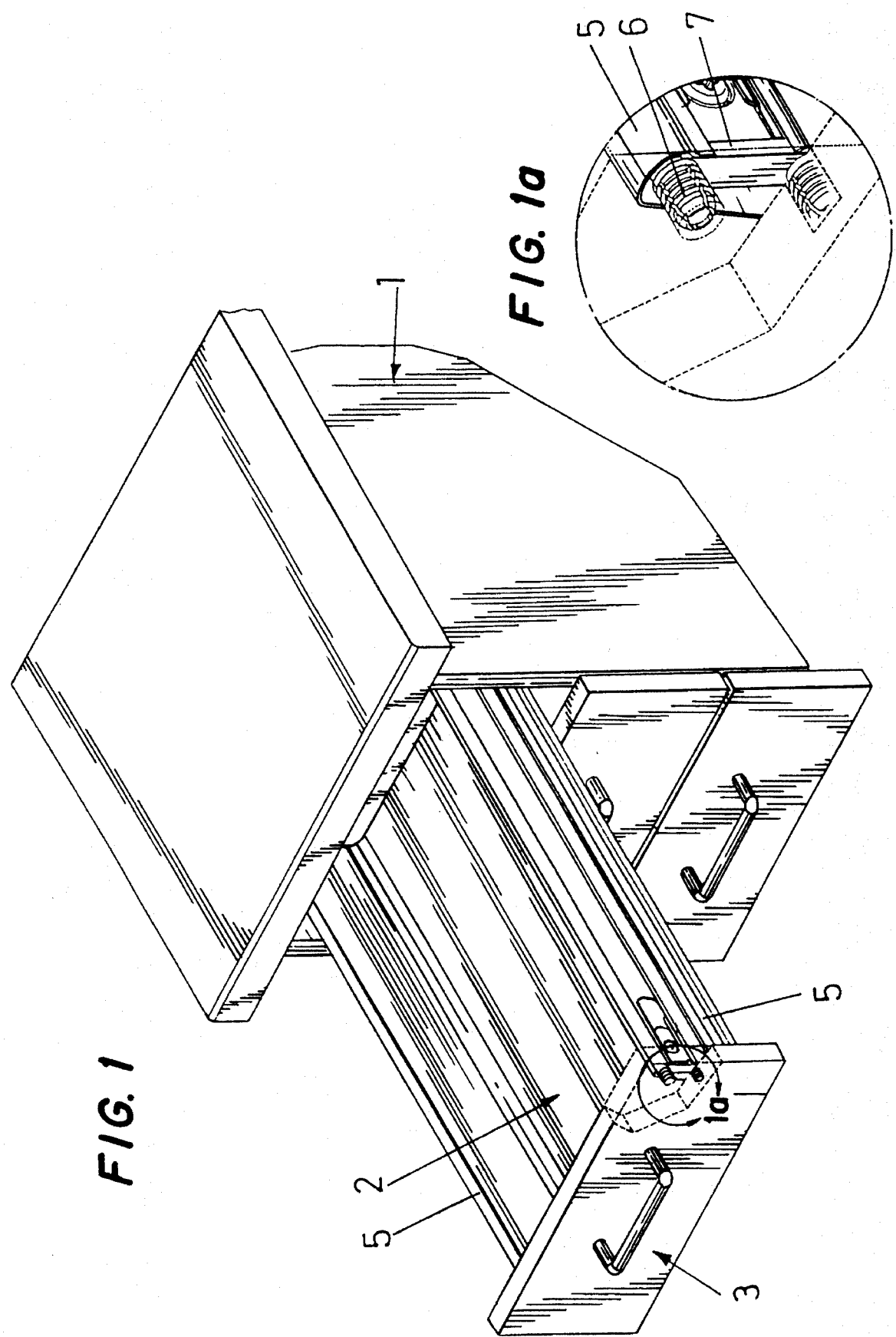
FIG. 1 is a perspective view of a piece of furniture with a drawer having a front plate connected to side walls by a furniture fitting according to the invention.

FIG. 1 shows a cabinet 1 with drawers 2, each drawer having a front plate 3 and drawer side walls 5. The front plate 3 is connected to each drawer side wall 5 by means of a coupling member (not shown) situated in the drawer side wall 5 and a fitting according to the invention. The fitting includes a holding member 8 and dowels 6 which are insertable in two holes on the front plate 3. When the front plate 3 is fixed to the side walls 5 the holding members 8 are held by the coupling members within the drawer side walls 5.

Each fitting is provided with two dowels 6 which are connected by means of a plate. The dowels 6 and the plate 7 are made in one piece and are preferably molded of plastic material. Within each dowel 6 is an expansion member 10 having an inner end having truncated conical shape. The expansion members 10 are connected to flanges 4 of the holding member 8 by respective axles 11. Each flange 4 has a cam surface 9. The holding member 8 is mounted on the front plate 3 when the dowels 6 are inserted into the holes 22 in the front plate 3.

Figure 3:
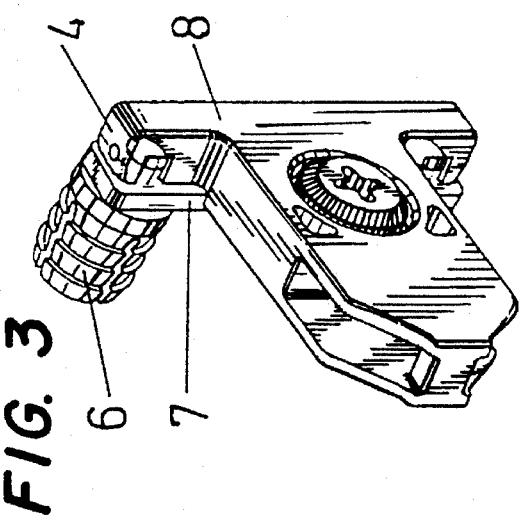
FIG. 3 is a perspective view of such furniture fitting in a position in which dowels are insertable into holes in a furniture part.

When holding member 8 is in an inclined or tilted position shown in FIG. 3, then the expansion members 10 are in a relaxed position, that is a position in which the dowels 6 can be inserted into the holes 22 in the front plate 3 or can be removed from holes 22. If the holding member 8 is turned or tilted into the position shown in FIG. 4, the expansion members 10 are moved into their locked positions and the dowels 6 are expanded within holes 22 such that the furniture fitting is fixed to the front plate 3. Thereafter, the front plate 3 can be connected to the corresponding coupling member which is mounted in the drawer side wall 5 by means of the holding members 8. The holding member 8 is also provided with an adjustment screw for adjusting the lateral position of the front plate 3 with respect to the drawer side walls 5.

Figure 2:
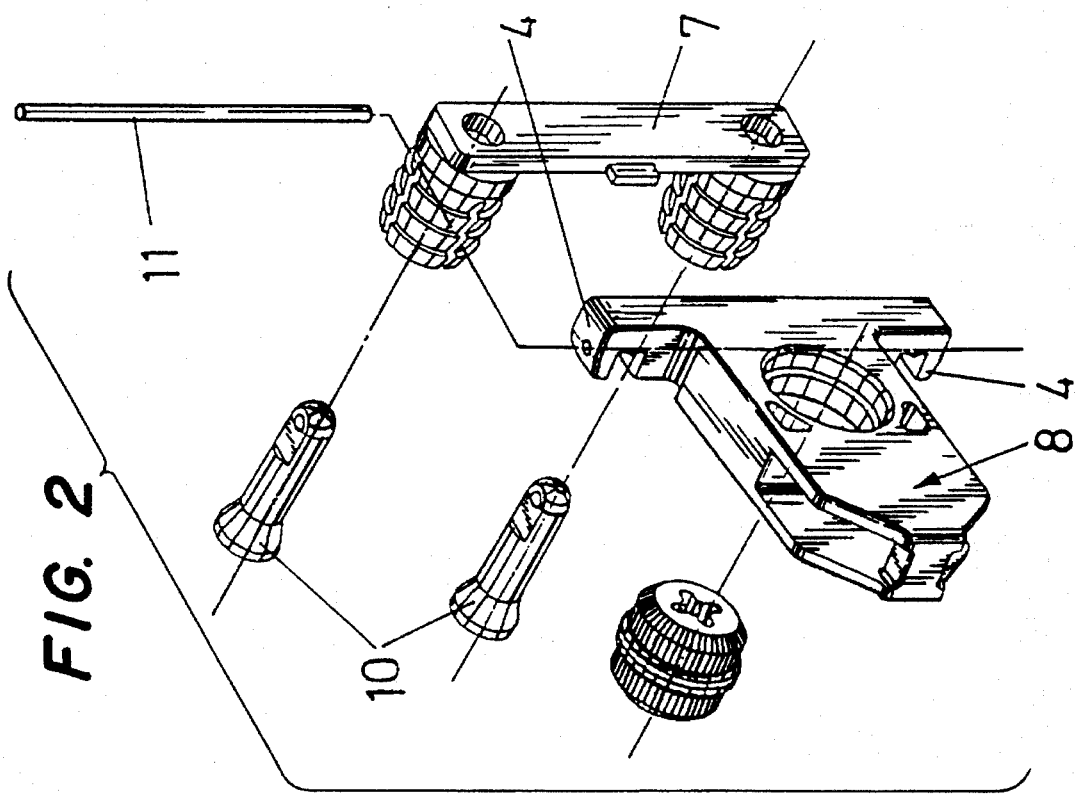
FIG. 2 is an exploded perspective view of a furniture fitting according to the invention including a holding member for a front plate of a drawer.
Figure 4:
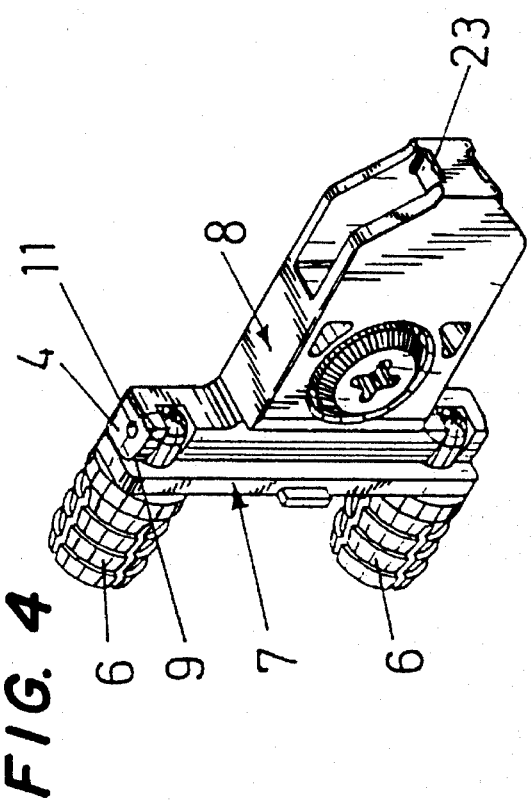
FIG. 4 is a perspective view of such furniture fitting in a locked position.
Figure 9:
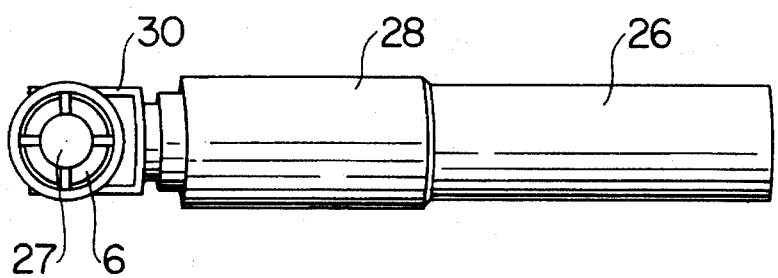
FIGS. 9 to 12 are views of a furniture fitting including a holding member for a drawer rail.
Figure 10:
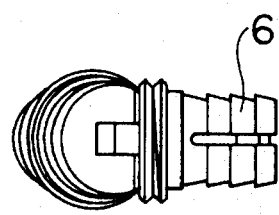
Figure 11:
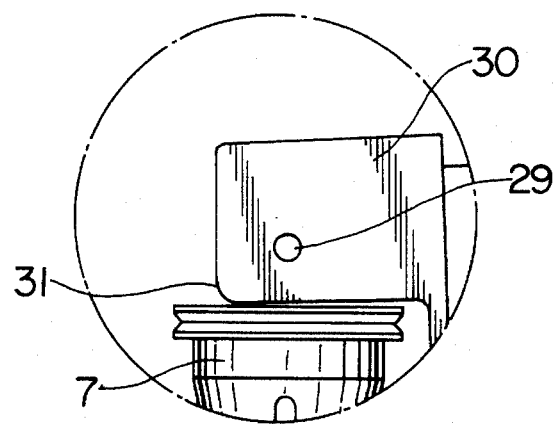
Figure 11A:
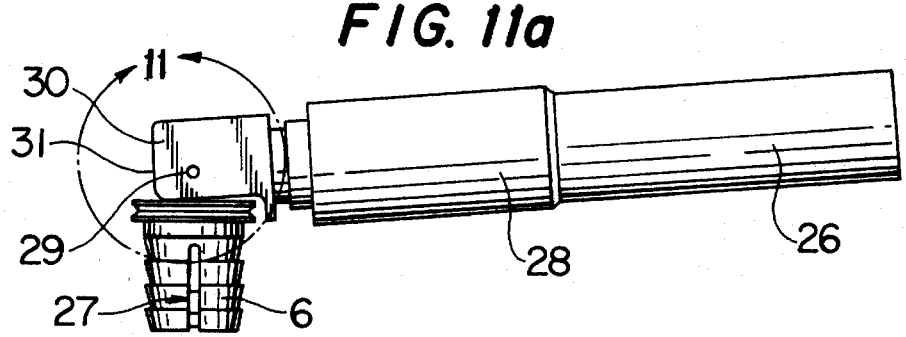
Figure 12:
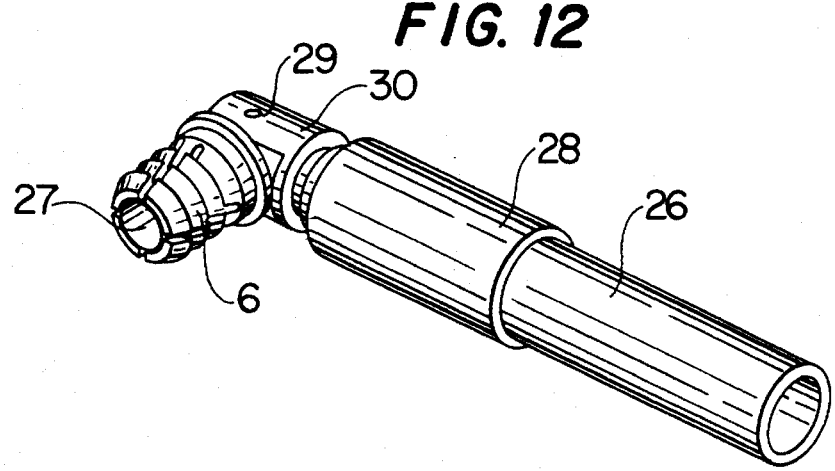
Figure 14:
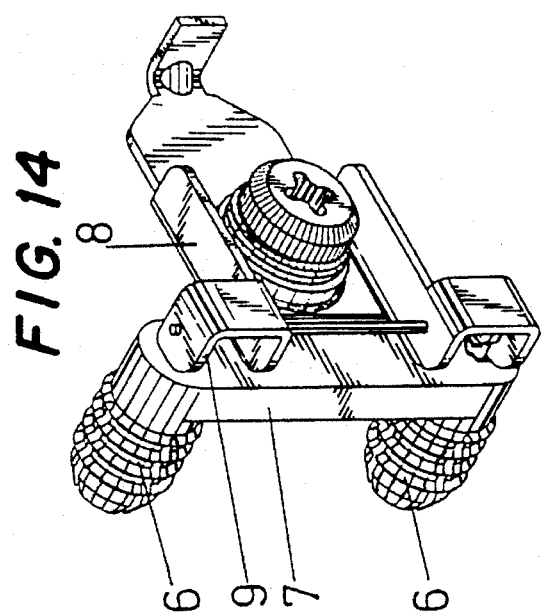
FIG. 14 is a perspective view of such fitting in a position in which it is mountable on a piece of furniture.
Figure 15:
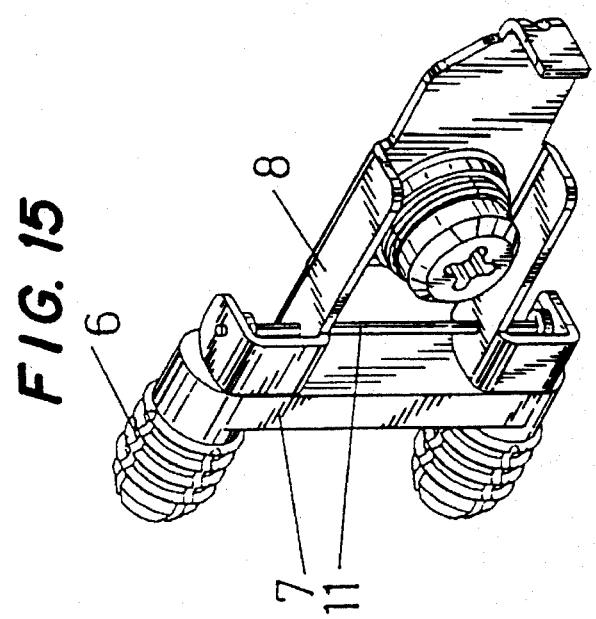
FIG. 15 is a perspective view of the same fitting in a locked position.
Figure 13:
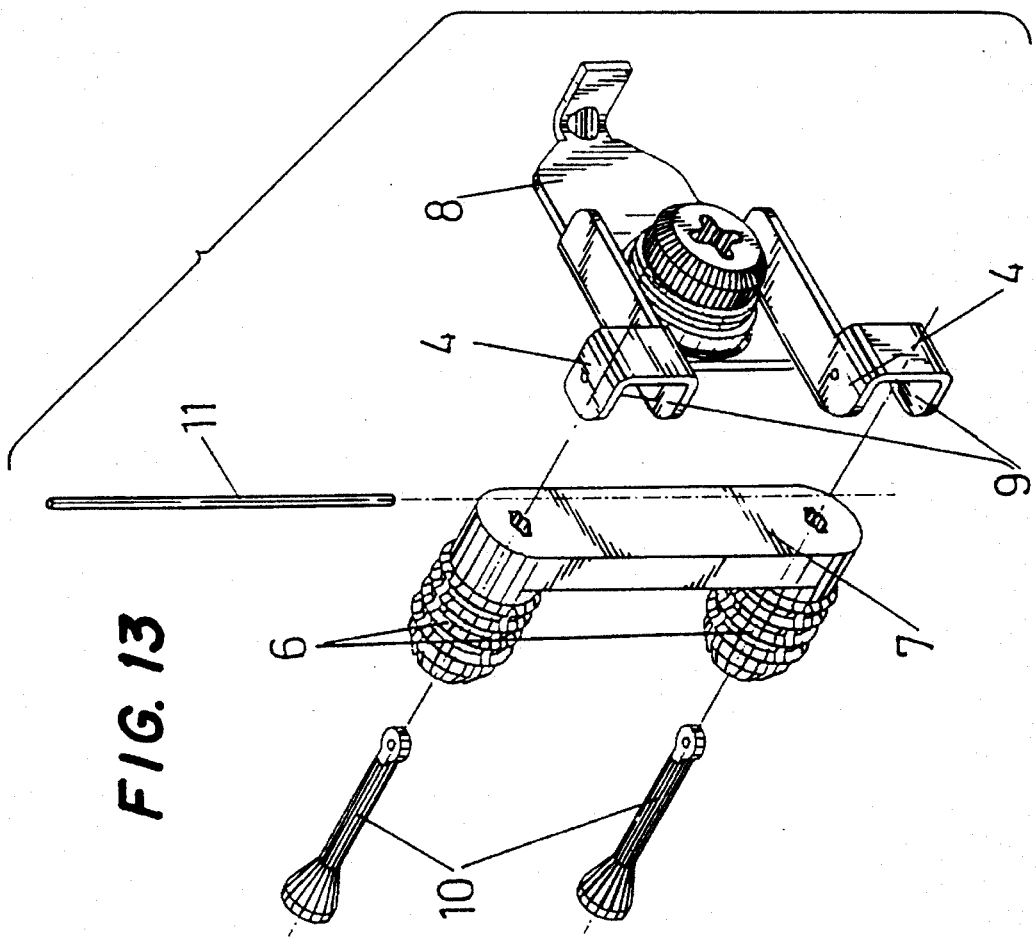
FIG. 13 is an exploded perspective view of a further embodiment of a fitting according to the invention.

The embodiment shown in FIGS. 13 to 14 has the same function as the embodiment shown in FIGS. 2 to 4. While the holding member 8 according to the embodiment of FIGS. 2 to 4 is made of plastic material or die casting, the holding member 8 according to the embodiment of FIGS. 13 to 14 is made of sheet metal.

A drawer rail 26 can be mounted to the front plate 3 by a furniture fitting comprising a holding member 28 and a dowel 6. The dowel 6 is inserted into a hole in the front plate 3 while the holding member 28 is situated behind of front plate 3 as seen from the front of the drawer. Within the dowel 6 there is an expansion member 27 like the expansion member 10 of the embodiments described above and having an inner end in the form of a truncated cone. The expansion member 27 is connected to the holding member 28 by means of an axle 29. The holding member 28 has flanges 30 provided with cam surfaces which rest on the dowel 6. If the drawer rail 26 together with the holding member 28 is in the position shown in FIG. 5 the expansion member 27 is in its relaxed position inside the dowel 6 and the dowel 6 can be inserted into the hole 22, the front plate 3 or can be removed from this hole. By turning or tilting the drawer rail 26 and the holding member 28 about axle 29 into the position shown in FIG. 6, the expansion member 27 is moved within the dowel 6 into the locked position and the dowel 6 is expanded thereby clamping the wall of the hole 22 into which it is inserted. In this way the holding member 28 is fastened to the front plate 3.

Figure 17:
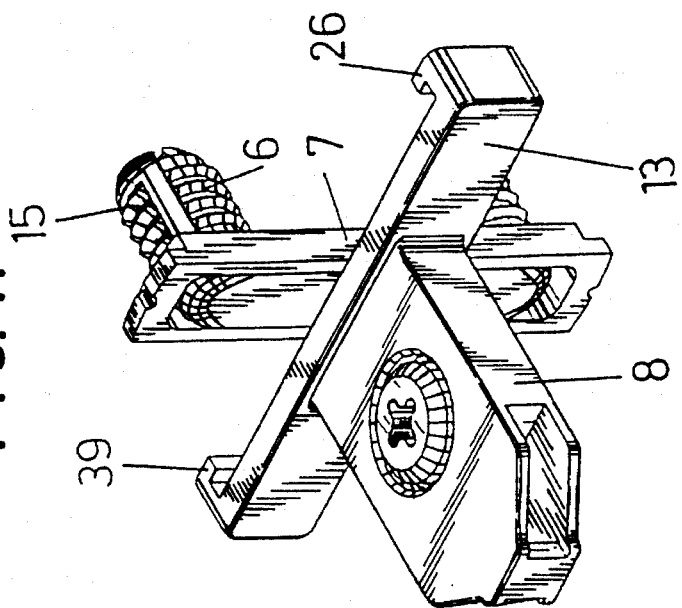
FIG. 17 is a perspective view of such fitting in a position in which it is mountable on a furniture part.
Figure 16:
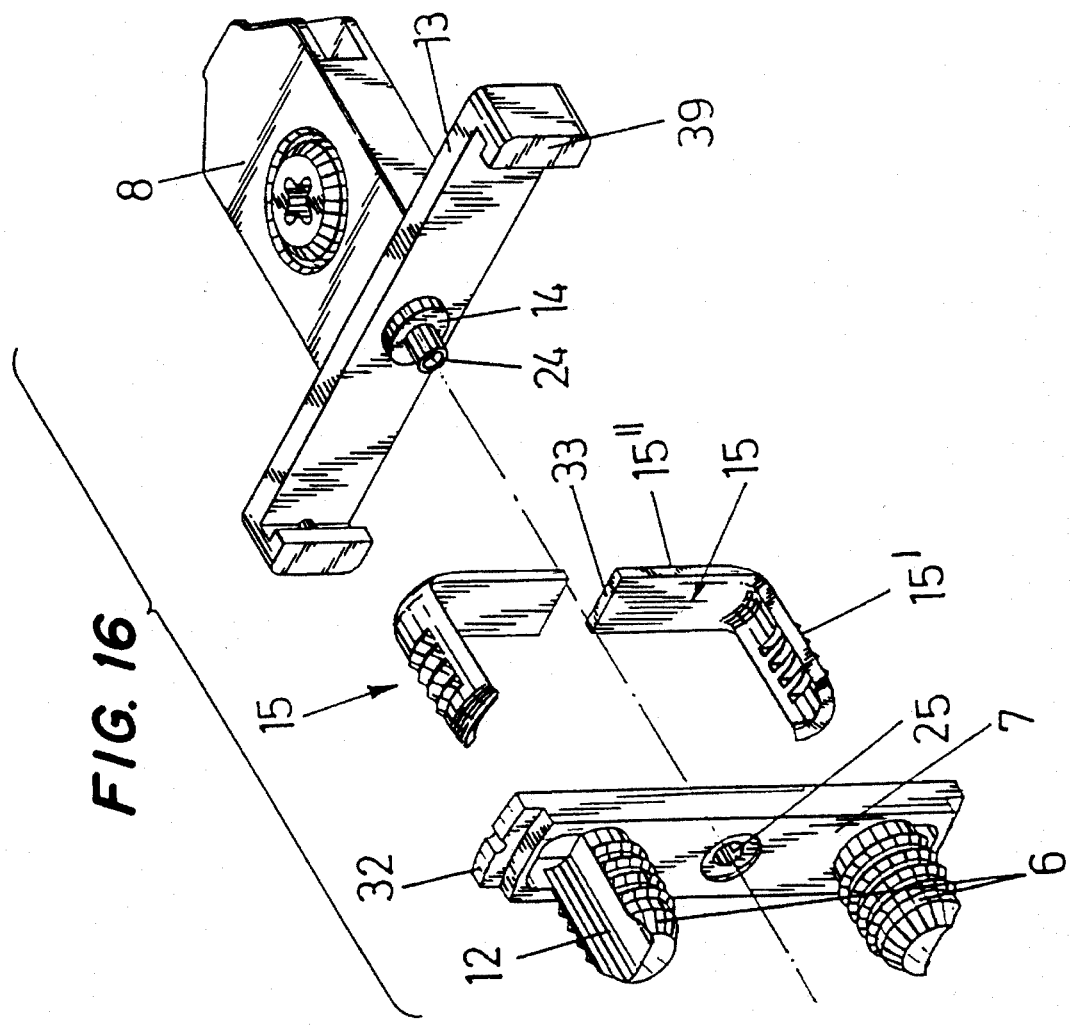
FIG. 16 is an exploded perspective view of a further embodiment of an inventive fitting.

In the embodiment of FIGS. 16 and 17, each of a pair of expansion members 15 has an angular configuration including a first arm 15' positioned in a recess 12 of each dowel 6 and a second arm 15" to be acted on by an eccentric 14 of the holding member 8. Dowels 6 are connected by a plate 7 whereby the dowels 6 and the plate 7 are made in one piece. The external recesses 12 of the dowels 6 face in opposite directions. The arms 15' are situated within the recesses 12 of the dowels 6. The arms 15' of the angular expansion members 15 extend through holes in the plate 7 so that the arms 15" are situated on the side of the plate 7 which is opposed to the dowels 6. The arms 15" can be situated within a recess in the plate 7.

The holding member 8 in this embodiment is provided with a cover plate 13 having spaced hooks 39. When the cover plate 13 and the holding member 8 are in a locked position the hooks 39 hook over respective end portions 32 of the plate 7. In the middle of the cover plate 13 is eccentric 14 and a pin 24. The pin 24 is insertable into a hole 25 in the plate 7. In the position in which the dowels 6 are insertable into holes in a furniture part, the holding member 8 and the cover plate 13 extend at an angle of 90° with respect to the plate 7. This position is shown in FIG. 17. The eccentric 14 is situated between the front ends 33 of the arms 15" of the expansion members 15. By rotating the holding member 8 around the pin 24 so that the cover plate 13 is brought to a position in which it covers the plate 7, the expansion members 15 are moved away from each other by means of the eccentric 14. By this movement the arms 15' are pressed to the walls of the holes 22, thereby locking the dowels 6 within the holes 22 and securing the fitting to the front plate 3.

Figure 19:
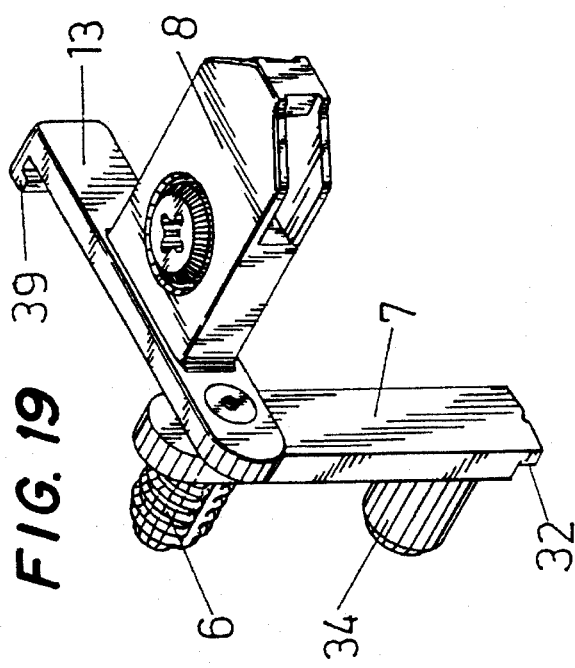
FIG. 19 is a perspective view of this embodiment in a position in which it is mountable on a furniture part.
Figure 20:
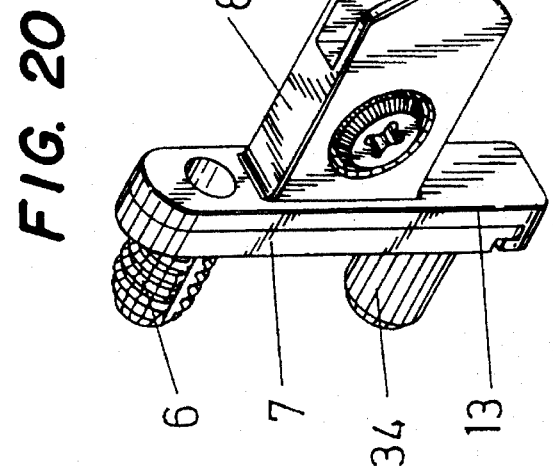
FIG. 20 is a perspective view of this furniture fitting in its locked position.
Figure 18:
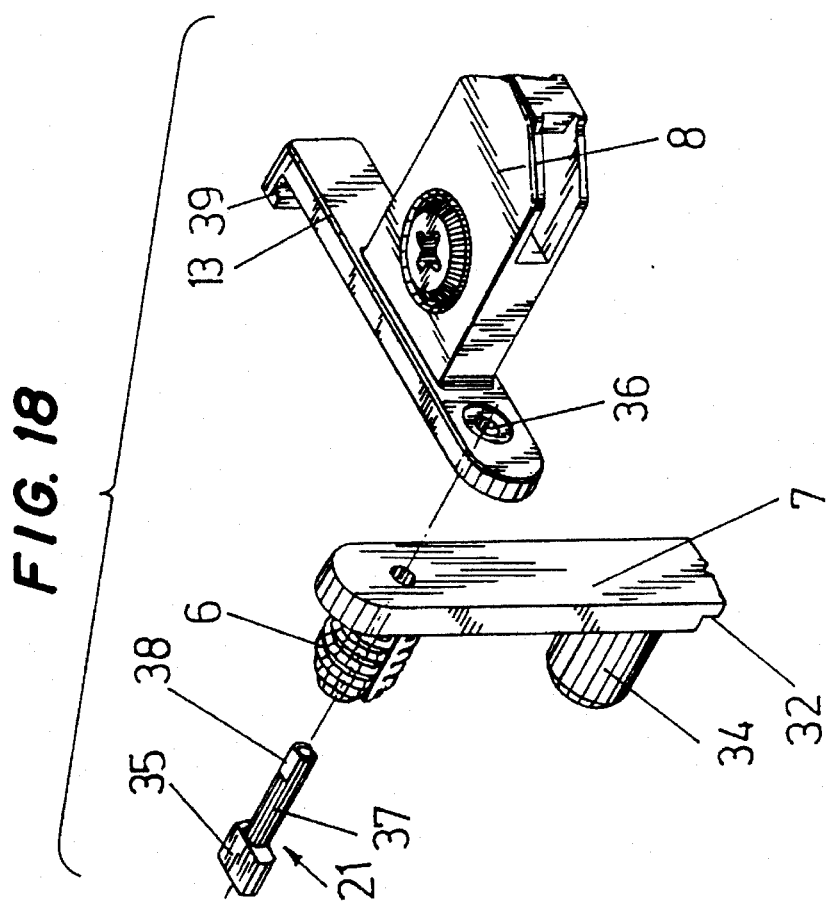
FIG. 18 is an exploded perspective view of a further embodiment of a fitting according to the invention.

In the embodiment of FIGS. 18 to 20 the plate 7 is provided with one dowel 6 and a positioning pin 34. An expansion member 21 is situated within the dowel 6. The expansion member 21 is provided at its end with a cam 35. The expansion member 21 is rigidly connected to cover plate 13 of the holding member 8. A shaft 37 of the expansion member 21 has an end with a non-circular circumference that is with a flattening 38. This end is held in a corresponding hole 36 in the cover plate 13. The cover plate 13 has one end provided with a hook 39 which in the locked position of the holding member 8 hooks over the respective end portion 32 of the plate 7.

In the position of the holding member 8 shown in FIG. 19, the dowel 6 can be inserted into the hole 22 in the front plate 3. By rotation of the holding member 8 into the position shown in FIG. 20, the cam 35 is rotated in such a way that flanges of the dowel 6 are expanded and pressed to the wall of the hole 22. In this way the holding member 8 and the plate 7 are secured to the front plate 3 by the dowel 6.

Although all of the embodiments of the furniture fitting of the invention have been described and illustrated with respect to connecting a drawer side wall or a drawer rail to a drawer front wall, it is contemplated that the furniture fitting of the present invention equally could be employed for connecting together other parts of an article of furniture. For example, it is contemplated that the furniture fitting of the present invention could be incorporated into a hinge mounting a door to an article of furniture. Further, the furniture fitting of the present invention could be employed to mount a rear wall of a drawer to a side wall thereof or to a drawer rail thereof. Yet further, it is contemplated that the furniture fitting of the present invention could be employed to connect together two abutting walls of an article of furniture. Other modifications and uses will be apparent to one of ordinary skill in the art from a consideration of the present disclosure.

We claim:

1. A furniture fitting for connecting parts of an article of furniture, said fitting comprising:

at least one dowel to be inserted into a hole in one furniture part;

an expansion member positioned within said dowel, said expansion member having an expansion surface and being movable axially relative to said dowel between a relaxed position enabling said dowel to be inserted into the hole and an expanded position, whereat said expansion surface expands said dowel, enabling said dowel to be locked in the hole; and a holding member to be connected to another furniture part, said holding member being connected to an end of said expansion member by a shaft for pivotable movement about said shaft, said holding member having a cam surface for abutment with a surface fixed relative to said dowel, such that pivotal movement of said holding member causes said cam surface to abut said surface fixed relative to said dowel and said holding member to move said expansion member axially of said dowel to move to or from said expanded position thereof.

2. A furniture fitting as claimed in claim 1, wherein said at least one dowel comprises two dowels insertable into respective holes and mounted on a plate, each said dowel having therein a respective axially movable expansion member.

3. A furniture fitting as claimed in claim 2, wherein said cam surface abuts said plate.

4. A furniture fitting as claimed in claim 1, wherein said at least one dowel comprises only a single dowel, and said cam surface abuts said dowel.

5. A furniture fitting as claimed in claim 1, wherein said holding member comprises a member to be connected to a side wall of a drawer for mounting thereon a drawer front wall.

6. A furniture fitting as claimed in claim 1, wherein said holding member comprises a member to be connected to a drawer rail for mounting thereof on a drawer front wall.

7. A furniture fitting for connecting parts of an article of furniture, said fitting comprising:

two dowels to be inserted into respective holes in one furniture part, said dowels being mounted on a plate;

each said dowel having positioned therein a respective expansion member, each said expansion member having an expansion surface and being movable axially relative to the respective said dowel between a relaxed position enabling said respective dowel to be inserted into the respective hole and an expanded position, whereat the respective said expansion surface expands said respective dowel, enabling said respective dowel to be locked in the respective hole, and each said expansion member having an end extending through said plate; and a holding member to be connected to another furniture part, said holding member being connected to said ends of said expansion members for pivotal movement relative thereto to actuate said expansion members to move to or from said expanded position thereof.

8. A furniture fitting as claimed in claim 7, wherein said holding member has at least one cam surface for abutment with said plate, such that pivotal movement of said holding member causes said cam surface to abut said plate and said holding member to move said expansion members axially of said dowels.

9. A furniture fitting as claimed in claim 8, wherein said pivotal movement is about a shaft connecting at least one of said ends to said holding member.

10. A furniture fitting as claimed in claim 7, wherein said holding member comprises a member to be connected to a side wall of a drawer for mounting thereon a drawer front wall.

* * * * *